US006914889B1

(12) United States Patent
Bi et al.

(10) Patent No.: US 6,914,889 B1
(45) Date of Patent: Jul. 5, 2005

(54) VARIABLE RATE FORWARD POWER CONTROL FOR MULTICHANNEL APPLICATIONS

(75) Inventors: Qi Bi, Morris Plains, NJ (US); Raafat Edward Kamel, Westfield, NJ (US); Harvey Rubin, Morris Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/207,748

(22) Filed: Dec. 8, 1998

(51) Int. Cl.[7] .............................................. H04B 7/185
(52) U.S. Cl. ...................................... 370/318; 455/522
(58) Field of Search ................................ 370/311, 313, 370/318, 329, 330, 333, 346, 331, 335, 441, 491, 500, 498, 479, 342; 455/13.4, 522; 340/522, 13.2; 375/343

(56) References Cited

U.S. PATENT DOCUMENTS

| | | | | |
|---|---|---|---|---|
| 5,267,262 A | * | 11/1993 | Wheatley, III | ............... 455/522 |
| 5,528,593 A | | 6/1996 | English et al. | |
| 5,570,353 A | * | 10/1996 | Keskitalo et al. | ........... 370/335 |
| 5,629,934 A | | 5/1997 | Ghosh et al. | |
| 5,737,327 A | * | 4/1998 | Ling et al. | ................... 370/335 |
| 5,896,411 A | * | 4/1999 | Ali et al. | ..................... 375/130 |
| 5,933,781 A | * | 8/1999 | Willenegger et al. | ........ 455/522 |
| 5,940,743 A | * | 8/1999 | Sunay et al. | .................. 455/69 |
| 5,991,285 A | * | 11/1999 | Ghosh | ........................ 370/355 |
| 6,047,015 A | * | 4/2000 | Watanabe et al. | ........... 375/132 |
| 6,058,107 A | * | 5/2000 | Love et al. | .................. 370/332 |
| 6,101,179 A | * | 8/2000 | Soliman | ...................... 370/342 |
| 6,128,506 A | * | 10/2000 | Knutsson et al. | ........... 455/522 |
| 6,137,840 A | * | 10/2000 | Tiedemann, Jr. et al. | ... 375/297 |
| 6,163,708 A | * | 12/2000 | Groe | .......................... 455/522 |
| 6,188,678 B1 | * | 2/2001 | Prescott | ..................... 370/318 |
| 6,223,056 B1 | * | 4/2001 | Appel | ........................ 455/561 |
| 6,275,478 B1 | * | 8/2001 | Tiedemann, Jr. | ............ 370/318 |
| 6,298,095 B1 | * | 10/2001 | Kronestedt et al. | ......... 375/295 |
| 6,307,844 B1 | * | 10/2001 | Tsunchara et al. | .......... 370/318 |
| 6,490,460 B1 | * | 12/2002 | Soliman | ..................... 455/522 |
| 6,614,771 B1 | * | 9/2003 | Kim et al. | .................. 370/335 |

FOREIGN PATENT DOCUMENTS

EP            0847147        6/1998

\* cited by examiner

*Primary Examiner*—Dang Ton
*Assistant Examiner*—Phuc Tran

(57) ABSTRACT

Separate power control for the forward voice channel and forward data channel is provided without using additional bandwidth or decreasing the amount of pilot signal provided from the mobile to the base station. Alternating voice and data power control commands or information are transmitted in the pilot channel by a mobile to a base station. In one embodiment, the power control portion of a first pilot channel segment is used to provide power control for the forward voice channel and then in the following pilot channel segment, the power control portion is used to provide power control for the forward data channel. In other embodiments, other than a 50/50 mix between voice and data power control is provided in the mobile's pilot channel. For example, forward voice channel power control commands may be transmitted two or more times for each transmission of forward data channel power control commands.

20 Claims, 3 Drawing Sheets

| CONFIGURATION NAME | POWER CONTROL BIT PATTERN (EXAMPLE) | | | |
|---|---|---|---|---|
| V50 D750 | VDDD | DDDD | DDDD | DDDD |
| V100 D700 | VDDD | DDDD | VDDD | DDDD |
| V150 D650 | | | | |
| V200 D600 | VDDD | VDDD | VDDD | VDDD |
| V250 D550 | | | | |
| V ≡ VOICE    V300 D500 | VDVD | VDDD | VDVD | VDDD |
| D ≡ DATA    V350 D450 | | | | |
| V400 D400 | VDVD | VDVD | VDVD | VDVD |
| • | | | | |
| • | | | | |
| • | | | | |
| V750 D50 | V D V V | V D V V | V D V V | V D V V |

| CONFIGURATION NAME | POWER CONTROL BIT PATTERN (EXAMPLE) | | | |
|---|---|---|---|---|
| V50 D750 | VDDD | DDDD | DDDD | DDDD |
| V100 D700 | VDDD | DDDD | VDDD | DDDD |
| V150 D650 | | | | |
| V200 D600 | VDDD | VDDD | VDDD | VDDD |
| V250 D550 | | | | |
| V300 D500 | VDVD | VDDD | VDVD | VDDD |
| V350 D450 | | | | |
| V400 D400 | VDVD | VDVD | VDVD | VDVD |
| • | | | | |
| • | | | | |
| • | | | | |
| V750 D50 | V D V V | V D V V | V D V V | V D V V |

V ≡ VOICE
D ≡ DATA

VARIABLE RATE FORWARD POWER CONTROL FOR MULTICHANNEL APPLICATIONS

BACKGROUND OF THE INVENTION

1. Field of the Invention

The present invention relates to telecommunications; more particularly, to transmit power control.

2. Description of the Related Art

FIG. 1 illustrates base station 10 and mobile terminal 12 of a CDMA (Code Division Multiple Access) communication system. Base station 10 and mobile terminal 12 communicate in the direction from base station 10 to mobile terminal 12 over forward or downlink channels 14. Mobile terminal 12 communicates with base station 10 using reverse or uplink channels 16. Forward link channels 14 may include separate channels for voice, data, a pilot signal, a dedicated control channel (DCCH) and other signals that provide control or overhead information. In a similar fashion, reverse channel 16 may include a voice channel, a data channel, a pilot channel and a dedicated control channel (DCCH). Depending on the type of communication going on, the voice channels may be omitted and data channels may be used, or data channels may be omitted and voice channels may used, or both voice and data channels may be used.

The amount of power used to transmit in the forward direction is adjusted to account for signal losses that may occur due to environmental conditions and/or signal fading that is a result of multiple paths between the base station and mobile. Mobile 12 monitors characteristics of the forward link such as overall power received or error rates. Based on the received power or the error rates, the mobile instructs base station 10 to either increase or decrease the amount of power used for transmission over the forward data and/or voice channels. For example, if the error rates are increasing or if they cross a threshold that was established when communications were initiated, the mobile instructs the base station to increase the power used for transmitting the forward voice and/or data channels. Similarly, if the mobile detects extremely low error rates, the mobile instructs base station 10 to decrease the power used for transmitting the forward voice and data channels. When the base station receives the power control instructions from the mobile, the base station modifies the power used to transmit the forward voice and data channels accordingly, FIG. 2 illustrates the pilot channel transmitted from mobile 12 to base station 10. The pilot channel is used by the mobile to transmit power control instructions to the base station. The pilot channel is broken into segments or power control groups 20 of 1.25 milliseconds in length. During portion or power control sub-channel 22 of each of the 1.25 milliseconds segments, the pilot signal is replaced by a power control signal, bit or command(s). The power control signal simply tells the base station to increase or decrease the power used to transmit the forward voice channel and forward data channel. The same power control information is used to control both the forward voice and data channels. This is acceptable since both channels are transmitting into the same environment and will suffer the same fluctuations due to the environment or fading. The remaining three-quarters of each 1.25 milliseconds segment is used for transmitting the pilot signal which enables the base station to coherently demodulate signals from the mobile.

FIG. 3 illustrates a mobile that is in a soft handoff condition where signals are received from two base stations. In this situation mobile 12 is receiving voice and data channels and a pilot channel from base station 10 and from base station 50. As was discussed with regard to FIG. 1, mobile 12 monitors the power and/or error rates associated with the voice and data signals and requests base stations 10 and 50 to either increase or decrease the power used to transmit voice and/or data on the forward link. In this situation, the mobile once again transmits power control commands as was described with regard to FIG. 2, and the same power control command is provided to both base station 10 and base station 50.

FIG. 4 illustrates the situation where mobile 12 is in a soft handoff condition receiving communications from base station 10 and base station 50. In this situation, mobile 12 is receiving a voice and data channel from base station 10, but only a voice channel from base station 50. This situation might arise in a soft handoff where base station 50 does not have sufficient resources available to provide both a voice and data channel to mobile 12, and therefore only provides a voice channel. Since this is an asymmetrical situation, the same power control information cannot be used to control both the voice and data forward channels. The voice and data are subjected to different fluctuations, the power control information derived from monitoring the voice cannot be applied to data and vice versa.

SUMMARY OF THE INVENTION

The present invention addresses the aforementioned problem by providing separate power control commands or information for the forward voice and forward data channels without using additional bandwidth or demanding additional pilot power provided from the mobile to the base station. The present invention provides alternating voice and data power control commands in the power control sub-channel of the pilot channel transmitted by mobile 12. In one embodiment, the power control portion or subchannel of a first pilot channel segment or power control group is used to transmit power control information for the forward voice channel, and then in the following pilot channel segment or power control group, the power control portion or subchannel is used to transmit power control information for the forward data channel. In other embodiments, other than a 50/50 mix between voice and data power control is provided in the mobile's pilot channel. For example, forward voice channel power control commands may be transmitted two or more times for each transmission of forward data channel power control commands.

DETAILED DESCRIPTION OF THE INVENTION

Figure 1:
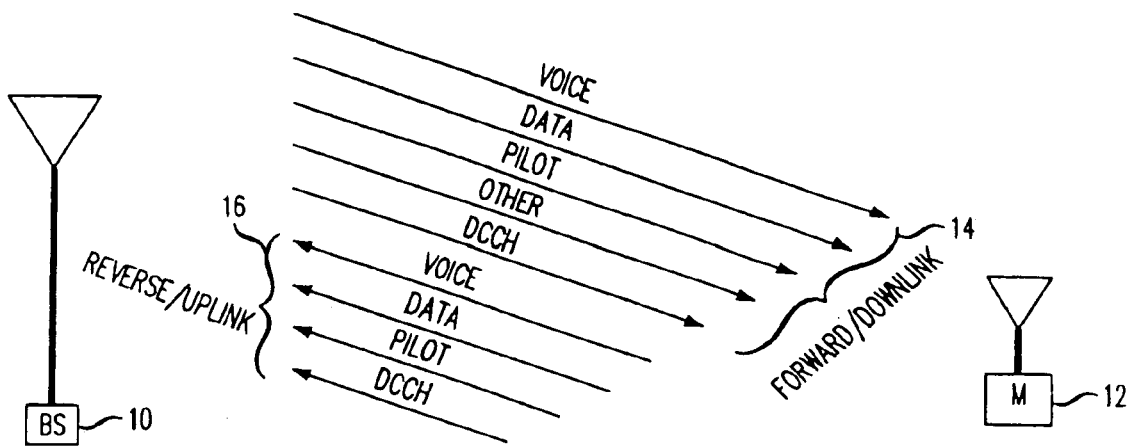
FIG. 1 illustrates a mobile communicating with the base station using voice and data channels.
Figure 2:
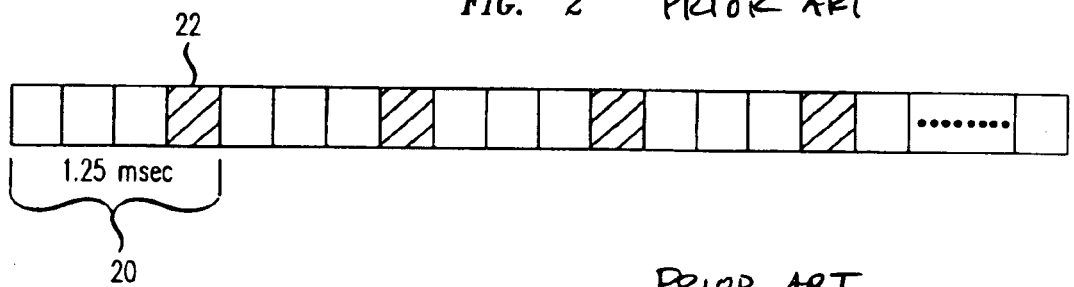
FIG. 2 illustrates a pilot channel with segments having power control portions.
Figure 3:
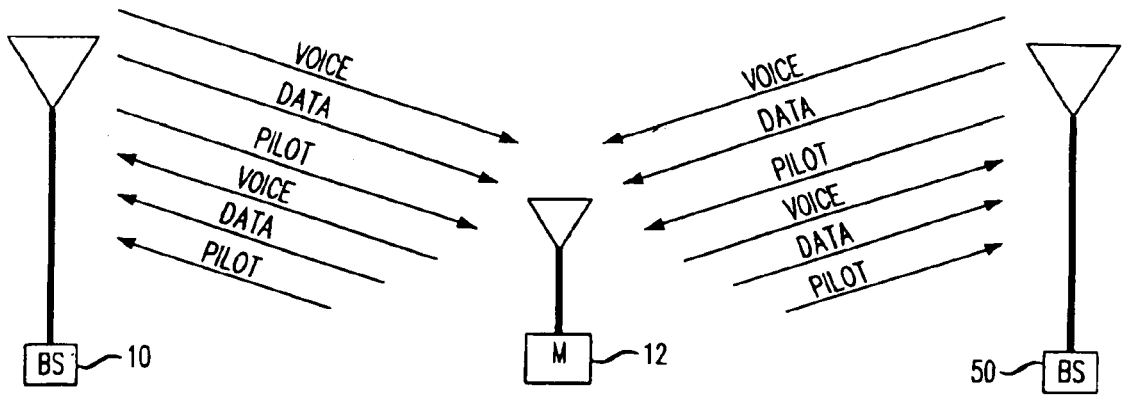
FIG. 3 illustrates a mobile in communication with two base stations using voice and data channels for both base stations.
Figure 4:
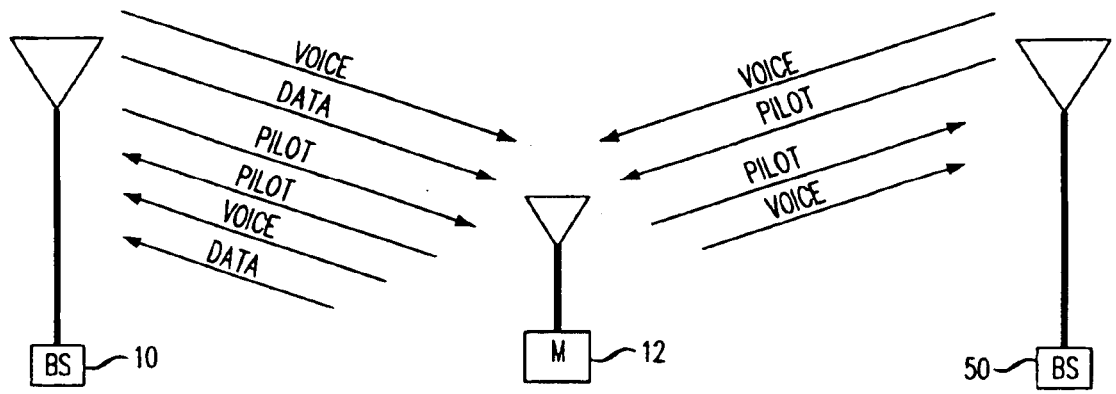
FIG. 4 illustrates a mobile in communication with two base stations where voice and data are used with one base station and voice is used without data for the second base station.
Figure 5:
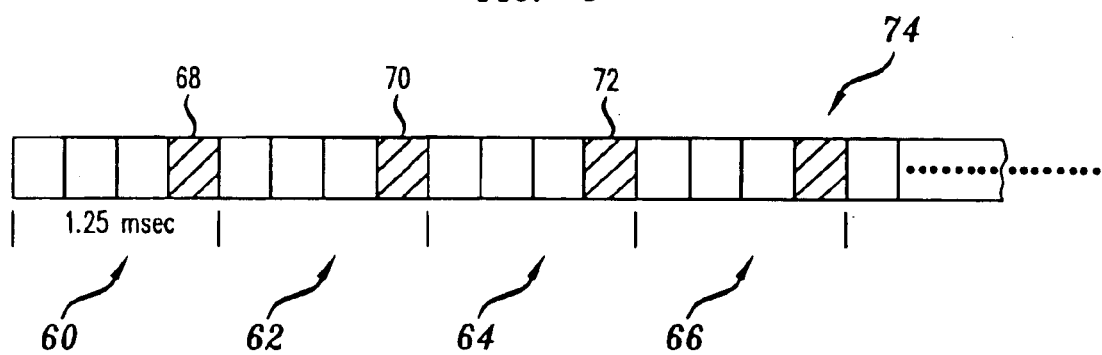
FIG. 5 illustrates a pilot channel where the power control sub-channel or portion of every other power control group or segment is used to transmit power control commands for the same forward channel.
Figure 6:
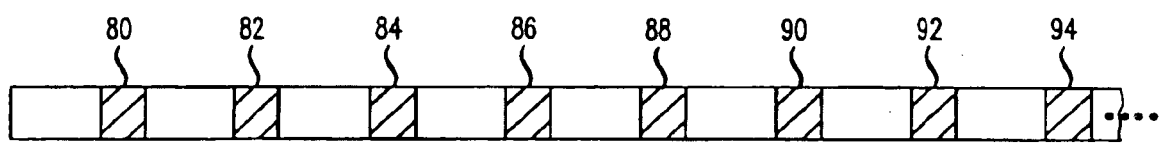
FIG. 6 illustrates a pilot channel where three transmissions of power control commands for a first forward channel are executed for each transmission of power control commands for a second forward channel.
Figures 7, 8:
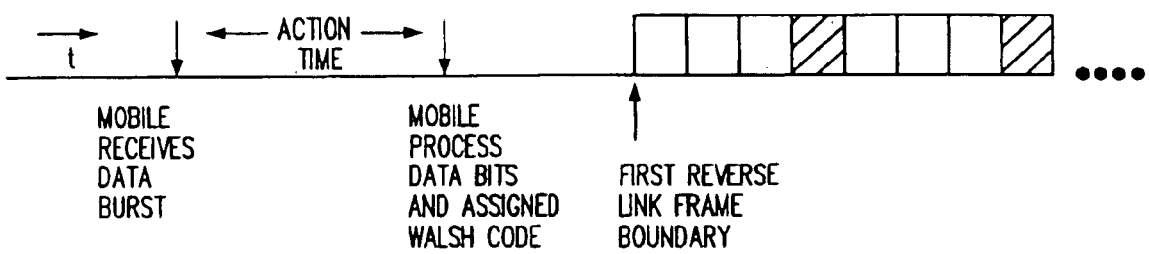
FIG. 7 is a table illustrating examples of power control information transmission patterns.
FIG. 8 is a timeline illustrating the relationship between communication channel initialization and the start of power control information transmission.

FIG. 5 illustrates a CDMA pilot control channel transmitted by mobile 12 to base stations, such as base stations 10 and 50. The pilot channel is divided into segments or power control groups 60, 62, 64 and 66 which are, for example, 1.25 milliseconds long. Corresponding portions or power control sub-channels 22 of each segment are used to transmit power control information or commands, portion 68 of segment 60 is used for power control, portion 70 of segment 62 is used for power control, portion 72 of segment 64 is used for power control, and portion 74 of segment 66 is used for power control. In this example, the portions used for power control are one-fourth of a segment or PCG (power control group). It is also possible for the power control portions to be greater than or less than one-fourth of a segment. The remaining portion of each segment is used to transmit a pilot signal. For this example, power control portions of consecutive segments and/or PCGs are used in an alternating manner to provide voice and data power control commands for the forward channels. For example, portions 68 and 72 may be used to provide power control commands for the forward voice channel while portions 70 and 74 may be used to provide power control for the forward data channel. As a result, separate power control is provided for the forward voice and data channels without degrading the pilot signal provided by the mobile. FIG. 6 illustrates a pilot channel where separate power control is used for the forward voice and data channels. In this example, power control for the voice and data channels is not split equally. For every three power control transmissions for the voice channel, only one power control transmission is provided for the data channel. Power control portions 80, 82 and 84 contain commands for forward voice power control and power control portion 86 contains power control commands for forward data channel power control. In a similar fashion power control portions 88, 90 and 92 are used for forward voice power control and portion 92 is used for forward data power control. This pattern repeats until, for example, the mobile receives new instructions from a base station, or until the voice or data channel is dropped. It is also possible to provide other combinations of alternating power control information. For example, three data power control transmissions may be provided for each voice power control transmission, two voice power control transmissions may be provided for each data power control transmission, or two data power control transmissions may be provided for each voice power control transmission. Other patterns may be used based on the priority given to the power control of a particular channel. A channel that has a high priority for power control is provided with more power control transmissions or bandwidth than a channel with a lower priority. FIG. 7 is a table that illustrates examples of possible power control transmission patterns.

It is also possible to provide power control for more than two forward channels, for example, power control may be provided for a voice channel, data channel and video channel, or for a voice channel and more than one data channel. When more than one channel is controlled, the power control information for each channel is transmitted, in an interleaved fashion, using the power control portion of the pilot channel segments.

FIG. 8 is a timeline illustrating channel initialization. When a communication channel is initialized, the base station sends a data burst assignment message to the mobile. This message includes setup information such as the Walsh code assignment(s) and the power control transmission pattern. After an action time specified by the base station in the burst assignment message, the base station starts sending data on the assigned Walsh channel. The mobile starts sending power control information according to the power control pattern at the first reverse link frame boundary transmitted by the mobile after the action time expires. The base station starts processing the power control information at the first reverse link frame boundary after the action time expires.

The invention claimed is:

1. A method for communicating power control information for at least two communication channels, comprising:
   transmitting power control information for a forward voice channel to be transmitted from a base station to a mobile station in a portion of a first segment of a reverse pilot channel transmitted from the mobile station to the base station; and
   transmitting power control information for a forward data channel in a corresponding portion of a second segment of the reverse pilot channel.

2. The method of claim 1, further comprising alternating between the transmission of power control information for the forward voice channel and the transmission of power control information for the forward data channel.

3. The method of claim 1, further comprising transmitting power control information for a third forward channel within a corresponding portion of a third segment of the reverse pilot channel, the third segment being one of the plurality of repeating segments, wherein the third forward channel is one of a forward data channel, forward voice channel and forward video channel.

4. The method of claim 1, wherein power control information for the first forward channel is transmitted at least two or mote times for each transmission of power control information for the second channel.

5. The method of claim 1, wherein the first segment is one of a plurality of repeating segments and the second segment is one of the plurality of repeating segments.

6. A method for communicating power control information for at least two communication channels, comprising:
   transmitting power control information in a portion of a first segment of a reverse pilot channel transmitted from a mobile station to a base station, wherein the power control information is for a first forward channel that is to be transmitted from the base station to the mobile station, the first segment being one of a plurality of repeating segments; and
   transmitting power control information in a corresponding portion of a second segment of the reverse pilot channel, wherein the power control information is for a second forward channel to be transmitted from the base station to the mobile station, the second segment being one of the plurality of repeating segments,
   wherein the first forward channel carries different information than the second forward channel.

7. The method of claim 6, wherein the power control information for the first forward channel is different than the power control information for the second forward channel.

8. The method of claim 6, wherein the first forward channel is one of a voice channel, data channel and video channel.

9. The method of claim 6, wherein the second forward channel is one of a voice channel, data channel and video channel.

10. The method of claim 6, further comprising alternating between the transmission of power control information for the first forward channel and the transmission of power control information for the second forward channel.

11. The method of claim 6, further comprising transmitting power control information in a corresponding portion of a third segment of the reverse pilot channel, wherein the power control information is for a third forward channel that is to be transmitted from the base station to the mobile station.

12. The method of claim 11, wherein the third segment is one of the plurality of repeating segments, and the third forward channel is one of a forward data channel, forward voice channel and forward video channel.

13. The method of claim 6, wherein power control information for the first forward channel is transmitted at least two or more times for each transmission of power control information for the second channel.

14. A method for communicating power control information for at least two communication channels, comprising:

transmitting power control information in a portion of a first segment of a reverse pilot channel transmitted from a mobile station to a base station, wherein the power control information is for a first forward channel to be transmitted from the base station to the mobile station, the first segment being one of a plurality of repeating segments; and transmitting power control information in a corresponding portion of a second segment of the reverse pilot channel, wherein the power control information is for a second forward channel to be transmitted from the base station to the mobile station, the second segment being one of the plurality of repeating segments.

15. The method of claim 14, wherein the power control information for the first forward channel is different than the power control information for the second forward channel.

16. The method of claim 14, wherein the first forward channel is one of a voice channel, data channel and video channel and the second forward channel is different from the first forward channel and is one of a voice channel data channel and video channel.

17. The method of claim 14, further comprising alternating between the transmission of power control information for the first forward channel and the transmission of power control information for the second forward channel.

18. The method of 14, further comprising transmitting power control information in a corresponding portion of a third segment of the reverse pilot channel, wherein the power control information is for a third forward channel that is to be transmitted from the base station to the mobile station.

19. The method of claim 18, wherein the third segment is one of the plurality of repeating segments, and the third forward channel is one of a forward data channel, forward voice channel and forward video channel.

20. The method of claim 14, wherein power control information for the first forward channel is transmitted at least two or more times for each transmission of power control information for the second channel.

* * * * *